US012656176B2

(12) United States Patent
Kasahara et al.

(10) Patent No.: US 12,656,176 B2
(45) Date of Patent: Jun. 16, 2026

(54) LIGHT DETECTION SYSTEM AND VOLTAGE DETERMINATION METHOD

(71) Applicant: HAMAMATSU PHOTONICS K.K., Hamamatsu (JP)

(72) Inventors: Takashi Kasahara, Hamamatsu (JP); Katsumi Shibayama, Hamamatsu (JP); Hiroki Oyama, Hamamatsu (JP); Yumi Kuramoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 182 days.

(21) Appl. No.: 18/685,342

(22) PCT Filed: Jun. 21, 2022

(86) PCT No.: PCT/JP2022/024678
§ 371 (c)(1),
(2) Date: Feb. 21, 2024

(87) PCT Pub. No.: WO2023/062881
PCT Pub. Date: Apr. 20, 2023

(65) Prior Publication Data
US 2024/0369410 A1    Nov. 7, 2024

(30) Foreign Application Priority Data

Oct. 11, 2021    (JP) ................................. 2021-166952

(51) Int. Cl.
G01J 3/26 (2006.01)
G01J 3/02 (2006.01)
(Continued)

(52) U.S. Cl.
CPC ................. G01J 3/26 (2013.01); G01J 3/027 (2013.01); G01J 3/0291 (2013.01); G02B 26/001 (2013.01); *G01J 2003/1213* (2013.01)

(58) Field of Classification Search
CPC .. G01J 3/26; G01J 3/027; G01J 3/0291; G01J 2003/1213; G01J 2003/1273; G02B 26/001; G02B 5/284
See application file for complete search history.

(56) References Cited

U.S. PATENT DOCUMENTS

2003/0116711 A1* 6/2003 Hara ................. G01N 21/3504
250/338.1
2014/0078503 A1* 3/2014 Matsushita ............... G01J 3/51
356/416

(Continued)

FOREIGN PATENT DOCUMENTS

| JP | 2001-228326 A | 8/2001 |
| JP | 2013-170867 A | 9/2013 |
| JP | 2019-049470 A | 3/2019 |

OTHER PUBLICATIONS

JP2013170867A translation with paragraphs number (Year: 2013).*

(Continued)

*Primary Examiner* — Tarifur R Chowdhury
*Assistant Examiner* — Carlos Perez-Guzman
(74) *Attorney, Agent, or Firm* — Faegre Drinker Biddle & Reath LLP

(57) ABSTRACT

A light detection system includes a Fabry-Perot interference filter including a first mirror and a second mirror, a distance therebetween being variable, a light detection unit configured to detect light in a wavelength range of $\lambda1$ or more and $\lambda2$ or less, and a control unit configured to apply a voltage to the Fabry-Perot interference filter such that the distance changes in a distance range of d1 or more and d2 or less. For a transmission spectrum T1 ($\lambda$) of light in a case where the distance is d1, a peak transmittance T1 ($\lambda a$) appears within the wavelength range, and a transmittance T1 ($\lambda2$) is less than or equal to 1%. For a transmission spectrum T2 ($\lambda$) of light in a case where the distance is d2, a peak transmittance (Continued)

T2 ($\lambda$b) appears within the wavelength range, and a transmittance T2 ($\lambda$1) is less than or equal to 1%.

17 Claims, 9 Drawing Sheets

(51) Int. Cl.
G01J 3/12 (2006.01)
G02B 26/00 (2006.01)

(56) References Cited

U.S. PATENT DOCUMENTS

| | | | |
|---|---|---|---|
| 2017/0122807 A1* | 5/2017 | Kasahara | G01J 3/524 |
| 2017/0138790 A1 | 5/2017 | Antila et al. | |
| 2019/0187043 A1* | 6/2019 | Wagner | G01N 15/147 |
| 2020/0191652 A1* | 6/2020 | Kasahara | G01J 3/0297 |
| 2020/0408977 A1* | 12/2020 | Eisenhammer | C23C 14/35 |
| 2021/0199568 A1 | 7/2021 | Thrush et al. | |

OTHER PUBLICATIONS

English-language translation of International Preliminary Report on Patentability (IPRP) dated Apr. 25, 2024 that issued in WO Patent Application No. JP2022/024678.
European Search Report issued on Sep. 4, 2025 in corresponding European patent application 22880587.5.

\* cited by examiner

100

LIGHT DETECTION
SYSTEM

1

LIGHT DETECTION
DEVICE

50

CONTROL UNIT

LIGHT DETECTION SYSTEM AND VOLTAGE DETERMINATION METHOD

TECHNICAL FIELD

The present disclosure relates to a light detection system and a voltage determination method.

BACKGROUND ART

There is known a light detection device including: a Fabry-Perot interference filter having a first mirror and a second mirror, a distance therebetween is variable; a light detector for detecting light transmitted through the first mirror and the second mirror; and a band pass filter disposed on a side opposite to the light detector with respect to the Fabry-Perot interference filter (see Patent Literature 1, for example).

CITATION LIST

Patent Literature

Patent Literature 1: Japanese Unexamined Patent Publication No. 2001-228326

SUMMARY OF INVENTION

Technical Problem

In the light detection device as described above, in a case where the distance between the first mirror and the second mirror varies in a predetermined distance range, light having wavelengths corresponding to a plurality of orders can be transmitted through the first mirror and the second mirror at each distance within the predetermined distance range. Therefore, the band pass filter is configured to mainly transmit light of having a wavelength corresponding to a single order at each distance within the predetermined distance range. However, if the distance range is not appropriately set (that is, it is necessary to appropriately set the voltage applied to the Fabry-Perot interference filter), not only the light having the wavelength corresponding to the single order but also a tail portion of the light having the wavelength corresponding to an order preceding or following the single order may also be transmitted through the band pass filter and the Fabry-Perot interference filter and detected by the light detector.

An object of the present disclosure is to provide a light detection system and a voltage determination method capable of accurately detecting light having a desired wavelength.

Solution to Problem

A light detection system according to one aspect of the present disclosure includes: a Fabry-Perot interference filter including a first mirror and a second mirror, a distance between the first mirror and the second mirror being variable; a light detection unit including a light detector which light transmitted through the first mirror and the second mirror enters, the light detection unit configured to detect light in a wavelength range of a wavelength $\lambda 1$ or more and a wavelength $\lambda 2$ ($>\lambda 1$) or less; and a control unit configured to apply a voltage to the Fabry-Perot interference filter such that the distance changes in a distance range of a distance d1 or more and a distance d2 ($>$d1) or less, in which, for a transmission spectrum T1 ($\lambda$) ($\lambda$ denotes a wavelength) of light transmitted through the first mirror and the second mirror in a case where the distance is the distance d1, a peak transmittance T1 ($\lambda a$) at a wavelength $\lambda a$ corresponding to a single order appears within the wavelength range, and a transmittance T1 ($\lambda 2$) at the wavelength $\lambda 2$ is less than or equal to 1%, and, for a transmission spectrum T2 ($\lambda$) of light transmitted through the first mirror and the second mirror in a case where the distance is the distance d2, a peak transmittance T2 ($\lambda b$) at a wavelength $\lambda b$ corresponding to a single order appears within the wavelength range, and a transmittance T2 ($\lambda 1$) at the wavelength $\lambda 1$ is less than or equal to 1%

In the light detection system, for the transmission spectrum T1 ($\lambda$) of light transmitted through the first mirror and the second mirror in the case where the distance between the first mirror and the second mirror is the distance d1, the peak transmittance T1 ($\lambda a$) at the wavelength $\lambda a$ corresponding to the single order appears within the wavelength range of the light detection unit, and the transmittance T1 ($\lambda 2$) at the wavelength $\lambda 2$ is less than or equal to 1%, the wavelength $\lambda 2$ being the upper limit value of the wavelength range. As a result, when light having the wavelength $\lambda a$ corresponding to the single order is detected, not only light outside the wavelength range (such as light having a wavelength corresponding to an order preceding or following the single order) but also the light having the wavelength $\lambda 2$ and a wavelength in the vicinity thereof are unlikely to be detected as noise light. In addition, for the transmission spectrum T2 ($\lambda$) of light transmitted through the first mirror and the second mirror in the case where the distance between the first mirror and the second mirror is the distance d2, the peak transmittance T2 ($\lambda b$) at the wavelength $\lambda b$ corresponding to the single order appears within the wavelength range of the light detection unit, and the transmittance T2 ($\lambda 1$) at the wavelength $\lambda 1$ is less than or equal to 1%, the wavelength $\lambda 1$ being the lower limit value of the wavelength range. As a result, when light having the wavelength $\lambda b$ corresponding to the single order is detected, not only light outside the wavelength range (such as light having a wavelength corresponding to an order preceding or following the single order) but also the light having the wavelength $\lambda 1$ and a wavelength in the vicinity thereof are unlikely to be detected as noise light. Therefore, according to this light detection system, light having a desired wavelength can be accurately detected.

In the light detection system according to one aspect of the present disclosure, a difference between the wavelength $\lambda 2$ and the wavelength $\lambda b$ may be larger than a difference between the wavelength $\lambda 1$ and the wavelength $\lambda a$. As a result, when the light having the wavelength $\lambda b$ corresponding to the single order is detected, it is possible to more effectively suppress detection of the light having the wavelength $\lambda 1$ and a wavelength in the vicinity thereof as noise light. This is because a peak interval of light of a plurality of orders transmitted through the first mirror and the second mirror in the case where the distance between the first mirror and the second mirror is the distance d2 tends to be wider than a peak interval of light of the plurality of orders transmitted through the first mirror and the second mirror in the case where the distance between the first mirror and the second mirror is the distance d1.

In the light detection system according to one aspect of the present disclosure, the light detection unit may further include a band pass filter disposed on a side opposite to the light detector with respect to the Fabry-Perot interference filter or between the Fabry-Perot interference filter and the light detector, the band pass filter may be configured to transmit light in the wavelength range, and a transmission spectrum T3 ($\lambda$) of light transmitted through the band pass filter may include a rising portion rising to the wavelength range and a falling portion falling from the wavelength range. As a result, a configuration for detecting light in a wavelength range of the wavelength $\lambda 1$ or more and the wavelength $\lambda 2$ or less can be easily and reliably implemented.

In the light detection system according to one aspect of the present disclosure, a transmittance at an intersection point of the transmission spectrum T1 ($\lambda$) and the falling portion may be less than or equal to 1%, and a transmittance at an intersection point of the transmission spectrum T2 ($\lambda$) and the rising portion may be less than or equal to 1%. As a result, when the light having the wavelength $\lambda$a corresponding to the single order is detected, it is possible to more effectively suppress detection of light outside the "wavelength range of the wavelength $\lambda 1$ or more and the wavelength $\lambda 2$ or less" (such as light having a wavelength corresponding to an order preceding or following the single order) as noise light. In addition, when the light having the wavelength $\lambda$b corresponding to the single order is detected, it is possible to more effectively suppress detection of light outside the "wavelength range of the wavelength $\lambda 1$ or more and the wavelength $\lambda 2$ or less" (such as light having a wavelength corresponding to an order preceding or following the single order) as noise light.

In the light detection system according to one aspect of the present disclosure, a wavelength at an intersection point of the transmission spectrum T1 ($\lambda$) and the rising portion may be more than or equal to a wavelength at a bottom point of the transmission spectrum T1 ($\lambda$) appearing on a short-wavelength side of the peak transmittance T1 ($\lambda$a). As a result, when the light having the wavelength $\lambda$a corresponding to the single order is detected, it is possible to more effectively suppress detection of the light having the wavelength $\lambda 1$ and a wavelength in the vicinity thereof as noise light.

In the light detection system according to one aspect of the present disclosure, a wavelength at an intersection point of the transmission spectrum T2 ($\lambda$) and the falling portion may be less than or equal to a wavelength at a bottom point of the transmission spectrum T2 ($\lambda$) appearing on a long-wavelength side of the peak transmittance T2 ($\lambda$b). As a result, when light having the wavelength $\lambda$b corresponding to the single order is detected, it is possible to more effectively suppress detection of the light having the wavelength $\lambda 2$ and light having a wavelength in the vicinity thereof as noise light.

In the light detection system according to one aspect of the present disclosure, a wavelength at a bottom point of the transmission spectrum T2 ($\lambda$) appearing on a long-wavelength side of the peak transmittance T2 ($\lambda$b) may be less than or equal to a long-wavelength side cutoff wavelength $\lambda$c of the light detector. As a result, when light having the wavelength $\lambda$b corresponding to the single order is detected, it is possible to more effectively suppress detection of the light having the wavelength $\lambda 2$ and light having a wavelength in the vicinity thereof as noise light.

In the light detection system according to one aspect of the present disclosure, a wavelength at an intersection point of the transmission spectrum T1 ($\lambda$) and the rising portion and a wavelength at an intersection point of the transmission spectrum T2 ($\lambda$) and the rising portion may be more than or equal to a wavelength at an intersection point of the transmission spectrum T1 ($\lambda$) and the transmission spectrum T2

($\lambda$) appearing on a short-wavelength side of the peak transmittance T1 ($\lambda$a). As a result, when the light having the wavelength $\lambda$a corresponding to the single order and the light having the wavelength $\lambda$b corresponding to the single order are detected, it is possible to more effectively suppress detection of the light having the wavelength $\lambda 1$ and light having a wavelength in the vicinity thereof as noise light.

In the light detection system according to one aspect of the present disclosure, a wavelength at an intersection point of the transmission spectrum T2 ($\lambda$) and the falling portion and a wavelength at an intersection point of the transmission spectrum T1 ($\lambda$) and the falling portion may be less than or equal to a wavelength at an intersection point of the transmission spectrum T1 ($\lambda$) and the transmission spectrum T2 ($\lambda$) appearing on the long-wavelength side of the peak transmittance T2 ($\lambda$b). As a result, when light having a wavelength $\lambda$a corresponding to a single order and light having a wavelength $\lambda$b corresponding to a single order are detected, it is possible to more effectively suppress detection of light having the wavelength $\lambda 2$ and light having a wavelength in the vicinity thereof as noise light.

In the light detection system according to one aspect of the present disclosure, a transmittance at an intersection point of the transmission spectrum T1 ($\lambda$) and the rising portion may be more than or equal to a transmittance at an intersection point of the transmission spectrum T2 ($\lambda$) and the rising portion, and a transmittance at an intersection point of the transmission spectrum T2 ($\lambda$) and the falling portion may be more than or equal to a transmittance at an intersection point of the transmission spectrum T1 ($\lambda$) and the falling portion. As a result, when the light having the wavelength $\lambda$b corresponding to the single order is detected, it is possible to more effectively suppress detection of the light having the wavelength $\lambda 1$ and a wavelength in the vicinity thereof as noise light. In addition, when the light having the wavelength $\lambda$a corresponding to the single order is detected, it is possible to more effectively suppress detection of the light having the wavelength $\lambda 2$ and a wavelength in the vicinity thereof as noise light.

In the light detection system according to one aspect of the present disclosure, a transmittance at an intersection point of the transmission spectrum T1 ($\lambda$) and the rising portion may be more than or equal to a transmittance at an intersection point of the transmission spectrum T1 ($\lambda$) and the falling portion. As a result, when the light having the wavelength $\lambda$a corresponding to the single order is detected, it is possible to more effectively suppress detection of the light having the wavelength $\lambda 2$ and a wavelength in the vicinity thereof as noise light.

In the light detection system according to one aspect of the present disclosure, a transmittance at an intersection point of the transmission spectrum T2 ($\lambda$) and the falling portion may be more than or equal to a transmittance at an intersection point of the transmission spectrum T2 ($\lambda$) and the rising portion. As a result, when the light having the wavelength $\lambda$b corresponding to the single order is detected, it is possible to more effectively suppress detection of the light having the wavelength $\lambda 1$ and a wavelength in the vicinity thereof as noise light.

In the light detection system according to one aspect of the present disclosure, the wavelength $\lambda 2$ may correspond to the long-wavelength side cutoff wavelength $\lambda$c of the light detector. As a result, a configuration for detecting light in a wavelength range of the wavelength $\lambda 1$ or more and the wavelength $\lambda 2$ or less can be easily and reliably implemented.

In the light detection system according to one aspect of the present disclosure, a transmittance T2 ($\lambda c$) of the transmission spectrum T2 ($\lambda$) at the long-wavelength side cutoff wavelength $\lambda c$ may be more than or equal to a transmittance T1 ($\lambda c$) of the transmission spectrum T1 ($\lambda$) at the long-wavelength side cutoff wavelength $\lambda c$. As a result, when the light having the wavelength $\lambda a$ corresponding to the single order is detected, it is possible to more effectively suppress detection of the light having the wavelength $\lambda 2$ and a wavelength in the vicinity thereof as noise light.

In the light detection system according to one aspect of the present disclosure, the transmittance T2 ($\lambda 1$) may be less than or equal to a transmittance T2 ($\lambda c$) of the transmission spectrum T2 ($\lambda$) at the long-wavelength side cutoff wavelength $\lambda c$. As a result, when the light having the wavelength $\lambda b$ corresponding to the single order is detected, it is possible to more effectively suppress detection of the light having the wavelength $\lambda 1$ and a wavelength in the vicinity thereof as noise light.

A voltage determination method according to one aspect of the present disclosure is a voltage determination method of determining a voltage in a light detection device, the light detection device including: a Fabry-Perot interference filter including a first mirror and a second mirror, a distance between the first mirror and the second mirror being variable; and a light detection unit including a light detector which light transmitted through the first mirror and the second mirror enters, the light detection unit configured to detect light in a wavelength range of a wavelength $\lambda 1$ or more and a wavelength $\lambda 2$ ($>\lambda 1$) or less, in a case where the voltage is applied to the Fabry-Perot interference filter such that the distance changes in a distance range of a distance d1 or more and a distance d2 ($>$d1) or less, the voltage determination method including: a first step of determining a voltage V1 at which the distance equals the distance d1; and a second step of determining a voltage V2 at which the distance equals the distance d2, in which, in the first step, for a transmission spectrum T1 ($\lambda$) ($\lambda$ denotes a wavelength) of light transmitted through the first mirror and the second mirror in a case where the distance is the distance d1, the voltage V1 is determined such that a peak transmittance T1 ($\lambda a$) at a wavelength $\lambda a$ corresponding to a single order appears within the wavelength range and that a transmittance T1 ($\lambda 2$) at the wavelength $\lambda 2$ is less than or equal to 1%, and, in the second step, for a transmission spectrum T2 ($\lambda$) of light transmitted through the first mirror and the second mirror in a case where the distance is the distance d2, the voltage V2 is determined such that a peak transmittance T2 ($\lambda b$) at a wavelength $\lambda b$ corresponding to a single order appears within the wavelength range and that a transmittance T2 ($\lambda 1$) at the wavelength $\lambda 1$ is less than or equal to 1%.

In this voltage determination method, in the case where the distance between the first mirror and the second mirror is the distance d1, the voltage V1 is determined such that, for the transmission spectrum T1 ($\lambda$) of light transmitted through the first mirror and the second mirror, the peak transmittance T1 ($\lambda a$) at the wavelength $\lambda a$ corresponding to the single order appears within the wavelength range of the wavelength $\lambda 1$ or more and the wavelength $\lambda 2$ or less and that the transmittance T1 ($\lambda 2$) at the wavelength $\lambda 2$ is less than or equal to 1%. As a result, when light having the wavelength $\lambda a$ corresponding to the single order is detected, not only light outside the wavelength range (such as light having a wavelength corresponding to an order preceding or following the single order) but also the light having the wavelength $\lambda 2$ and a wavelength in the vicinity thereof are unlikely to be detected as noise light. In addition, in the case where the distance between the first mirror and the second mirror is the distance d2, the voltage V2 is determined such that, for the transmission spectrum T2 ($\lambda$) of light transmitted through the first mirror and the second mirror, the peak transmittance T2 ($\lambda b$) at the wavelength $\lambda b$ corresponding to the single order appears within the wavelength range of the wavelength $\lambda 1$ or more and the wavelength $\lambda 2$ or less and that the transmittance T2 ($\lambda 1$) at the wavelength $\lambda 1$ is less than or equal to 1%. As a result, when light having the wavelength $\lambda b$ corresponding to the single order is detected, not only light outside the wavelength range (such as light having a wavelength corresponding to an order preceding or following the single order) but also the light having the wavelength $\lambda 1$ and a wavelength in the vicinity thereof are unlikely to be detected as noise light. According to the above-described voltage determination method, light having a desired wavelength can be accurately detected.

Advantageous Effects of Invention

According to the present disclosure, it is possible to provide a light detection system and a voltage determination method capable of accurately detecting light having a desired wavelength.

DESCRIPTION OF EMBODIMENTS

Hereinafter, embodiments of the present disclosure will be described in detail with reference to the drawings. The same or corresponding parts in the respective drawings are denoted with the same reference signs, and repetitive descriptions will be omitted.

Configuration of Light Detection System

Figure 1:
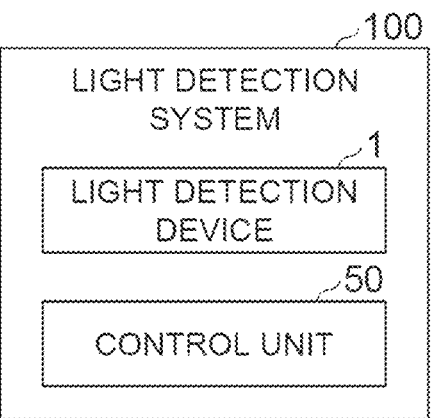
FIG. 1 is a block diagram of a light detection system according to an embodiment.

As illustrated in FIG. 1, a light detection system 100 includes a light detection device 1 and a control unit 50. The control unit 50 is electrically connected with the light detection device 1. The control unit 50 inputs and outputs an electric signal to and from the light detection device 1. As an example, the control unit 50 includes an integrated circuit such as a field-programmable gate array (FPGA), a nonvolatile memory such as an electrically erasable programmable read-only memory (EEPROM), a personal computer (PC), or the like.

Configuration of Light Detection Device

Figure 2:
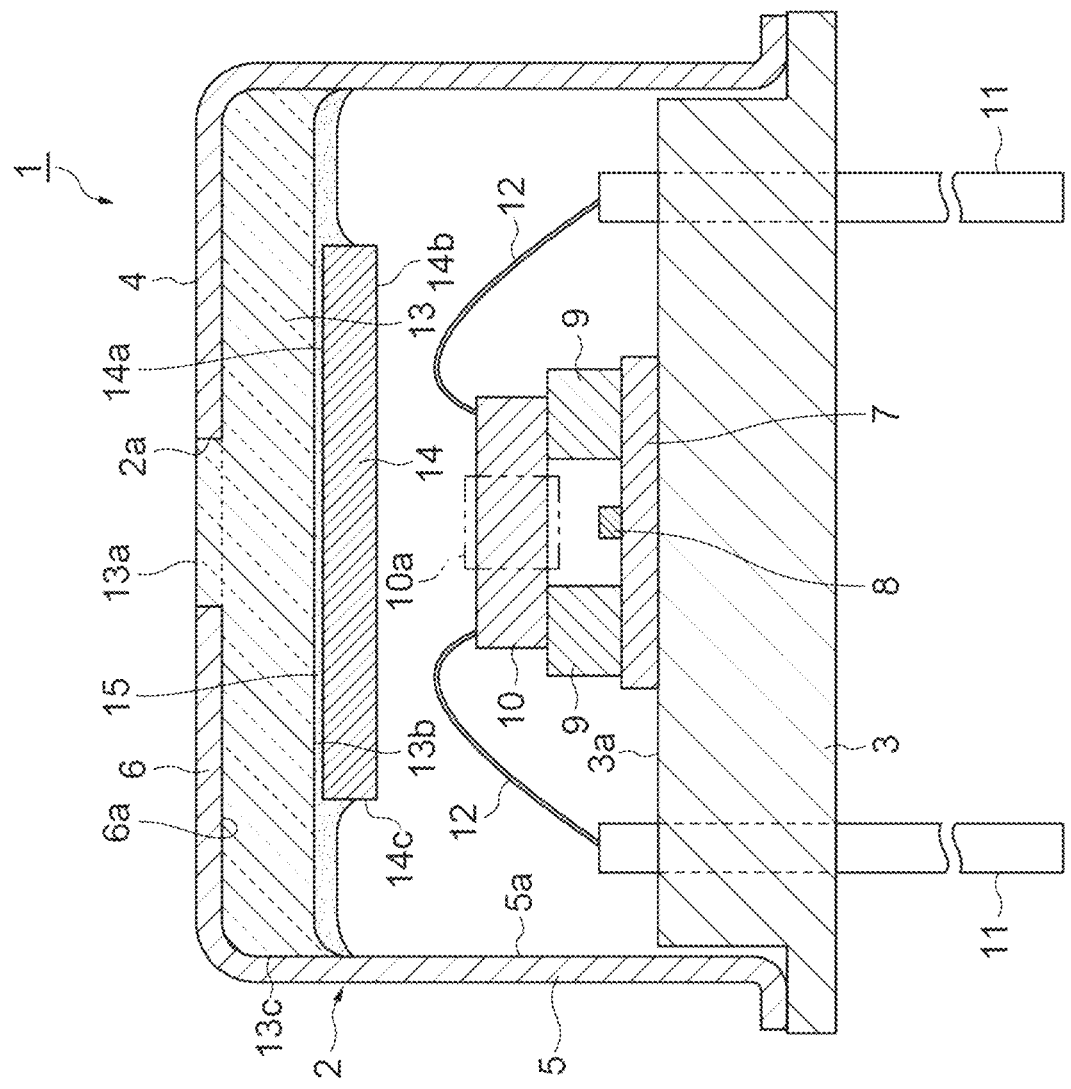
FIG. 2 is a cross-sectional view of a light detection device illustrated in FIG. 1.

As illustrated in FIG. 2, the light detection device 1 includes a package 2. The package 2 is a CAN package having a stem 3 and a cap 4. The cap 4 includes a cylindrical side wall 5 and a top wall 6. The side wall 5 and the top wall 6 are integrally formed of a metal material. The stem 3 is formed of a metal material in a plate shape. The stem 3 is airtightly joined to the cylindrical side wall 5 in such a manner as to face the top wall 6.

On an inner surface 3a of the stem 3, a wiring substrate 7 is fixed. As a material of the wiring substrate 7, for example, silicon, ceramic, quartz, glass, plastic, or other materials can be used. On the wiring substrate 7, a temperature compensating element (not illustrated) such as a light detector 8 and a thermistor is mounted. The light detector 8 is an infrared detector such as a quantum type sensor using InGaAs or other compounds or a thermal type sensor using a thermopile or a bolometer or other instruments. In a case where light of different wavelength regions of ultraviolet, visible, and near infrared regions, for example a silicon photodiode or other components can be used as the light detector 8. Note that the light detector 8 may include one light receiving unit or may include a plurality of light receiving units in an arrayed shape. Furthermore, a plurality of light detectors 8 may be mounted on the wiring substrate 7.

On the wiring substrate 7, a plurality of spacers 9 is fixed. As a material of the spacers 9, for example, silicon, ceramic, quartz, glass, plastic, or other materials can be used. A Fabry-Perot interference filter 10 is fixed on the plurality of spacers 9. A light transmission region 10a of the Fabry-Perot interference filter 10 faces a light receiving unit of the light detector 8. Note that the spacers 9 may be integrally formed with the wiring substrate 7. Alternatively, the Fabry-Perot interference filter 10 may be supported not by the plurality of spacers 9 but by one spacer 9.

A plurality of lead pins 11 is fixed to the stem 3. Each of the lead pins 11 penetrates through the stem 3 in a state where electrical insulation and airtightness with the stem 3 are maintained. Electrode pads provided to the wiring substrate 7, terminals of the light detector 8, terminals of the temperature compensating element, and terminals of the Fabry-Perot interference filter 10 are electrically connected to respective lead pins 11 via wires 12. The control unit 50 is electrically connected to each lead pin 11 via wiring (not illustrated). This enables the control unit 50 to input and output electric signals to and from each of the light detector 8, the temperature compensating element, and the Fabry-Perot interference filter 10.

The package 2 includes an opening 2a. More specifically, the opening 2a is formed in the top wall 6 of the cap 4 in such a manner as to face the light transmission region 10a of the Fabry-Perot interference filter 10. On an inner surface 6a of the top wall 6, a light transmitting member 13 is joined airtightly in such a manner as to close the opening 2a. The light transmitting member 13 includes a light incident surface 13a and a light emitting surface 13b facing each other and a side surface 13c. The light incident surface 13a of the light transmitting member 13 is substantially flush with an outer surface of the top wall 6 at the opening 2a. The side surface 13c of the light transmitting member 13 is in contact with an inner surface 5a of the side wall 5 of the package 2.

Such a light transmitting member 13 is formed by disposing a glass pellet inside a cap 4 with the opening 2a facing down and melting the glass pellet.

A band pass filter 14 is fixed to the light emitting surface 13b of the light transmitting member 13 by a bonding member 15. The band pass filter 14 is arranged on a side opposite to the light detector 8 with respect to the Fabry-Perot interference filter 10. The band pass filter 14 includes a light incident surface 14a and a light emitting surface 14b facing each other and a side surface 14c. As an example, the band pass filter 14 is obtained by forming a dielectric multilayer film (multilayer film formed by a combination of a high refractive material such as $TiO_2$ and $Ta_2O_5$ and a low refractive material such as $SiO_2$ and $MgF_2$) on a surface of a light transmitting member formed into a plate shape from a light transmitting material (for example, silicon, glass, etc.)

In the light detection device 1, the package 2 accommodates the wiring substrate 7, the light detector 8, the temperature compensating element (not illustrated), the plurality of spacers 9, the Fabry-Perot interference filter 10, and the band pass filter 14. In the light detection device 1, the opening 2a, the light transmitting member 13, and the band pass filter 14 are arranged on one side with respect to the Fabry-Perot interference filter 10, and the light detector 8 is disposed on the other side with respect to the Fabry-Perot interference filter 10.

In the light detection device 1 configured as described above, when light to be measured enters the light transmission region 10a of the Fabry-Perot interference filter 10 via the opening 2a, the light transmitting member 13, the bonding member 15, and the band pass filter 14, light having a predetermined wavelength among the light to be measured is transmitted through a first mirror and a second mirror of the Fabry-Perot interference filter 10 (the configuration of the Fabry-Perot interference filter 10 will be described later). Light transmitted through the first mirror and the second mirror of the Fabry-Perot interference filter 10 enters the light detector 8 and is detected by the light detector 8. As an example, in the light detection device 1, through detection of the light by the light detector 8, the light transmitted by the light transmission region 10a of the Fabry-Perot interference filter 10 while the voltage applied to the Fabry-Perot interference filter 10 is varied (namely, while the distance between the first mirror and the second mirror is varied in the Fabry-Perot interference filter 10), the optical spectrum of the light to be measured is obtained.

Configuration of Fabry-Perot Interference Filter

Figure 3:
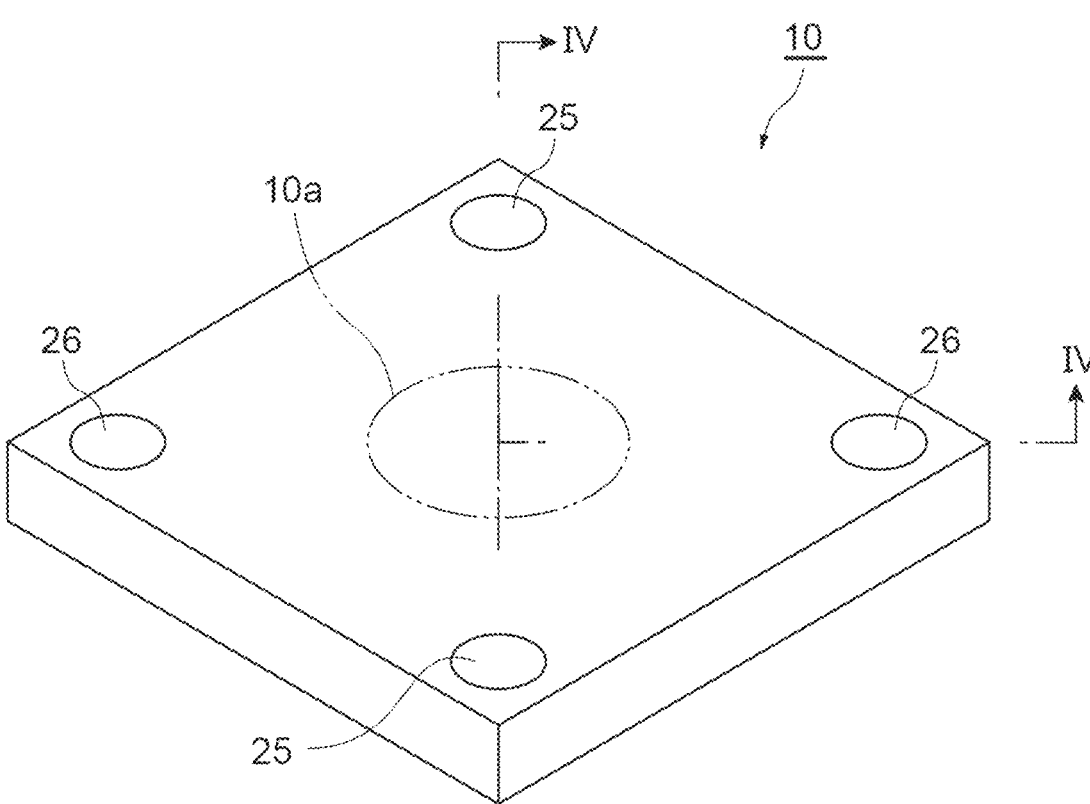
FIG. 3 is a perspective view of a Fabry-Perot interference filter illustrated in FIG. 2.

As illustrated in FIG. 3, the Fabry-Perot interference filter 10 includes the light transmission region 10a. As an example, the Fabry-Perot interference filter 10 has a rectangular plate shape, and the light transmission region 10a has a columnar shape. The light transmission region 10a selectively transmits light of a predetermined wavelength along the center line thereof (one-dot chain line illustrated in FIG. 3).

Figure 4:
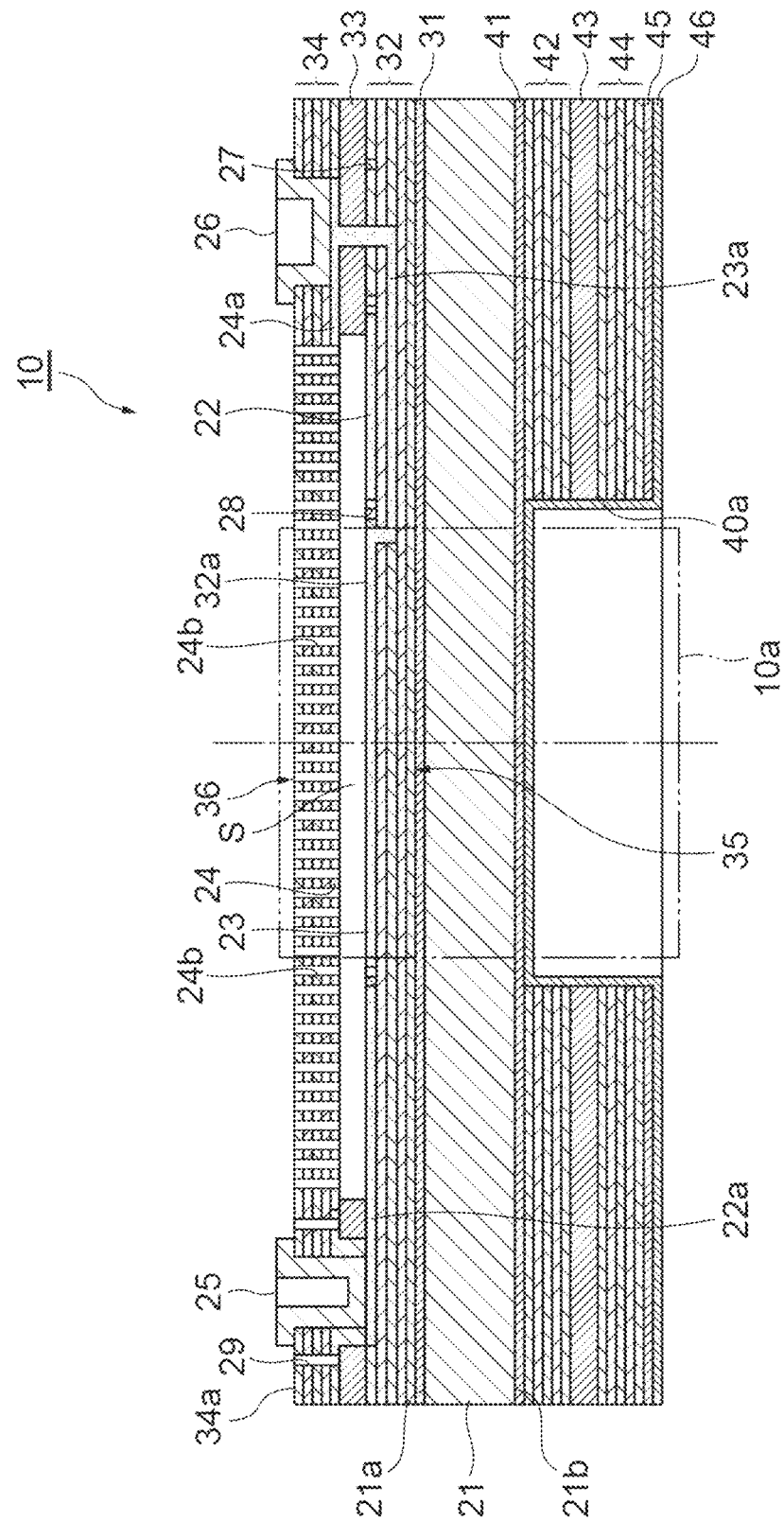
FIG. 4 is a cross-sectional view of the Fabry-Perot interference filter taken along line IV-IV in FIG. 3.

As illustrated in FIG. 4, the Fabry-Perot interference filter 10 includes a substrate 21. On a surface 21a of the substrate 21 on a light incident side, an antireflection layer 31, a first laminated body 32, an intermediate layer 33, and a second laminated body 34 are laminated in the order mentioned. A gap (air gap) S is formed between the first laminated body 32 and the second laminated body 34 by the intermediate layer 33 of a frame shape. The substrate 21 is made of, for example, silicon, quartz, glass, or other materials. In a case where the substrate 21 is made of silicon, the antireflection layer 31 and the intermediate layer 33 are made of, for example, silicon oxide. The thickness of the intermediate layer 33 is, for example, an integral multiple of ½ of the design center wavelength. Note that the thickness of the intermediate layer 33 may be larger than the integral multiple of ½ of the design center wavelength, as necessary.

A part of the first laminated body 32 corresponding to the light transmission region 10a functions as a first mirror 35. The first mirror 35 is supported by the substrate 21 via the antireflection layer 31. As an example, the first laminated body 32 includes a plurality of polysilicon layers and a plurality of silicon nitride layers, each layer of which laminated alternately. The optical thickness of each of the layers constituting the first mirror 35 is, for example, an integral multiple of ¼ of the design center wavelength. Note that silicon oxide layers may be used instead of the silicon nitride layers.

A part of the second laminated body 34 corresponding to the light transmission region 10a functions as a second mirror 36 facing the first mirror 35 via the gap S. The second mirror 36 is supported by the substrate 21 via the antireflection layer 31, the first laminated body 32, and the intermediate layer 33. As an example, the second laminated body 34 includes a plurality of polysilicon layers and a plurality of silicon nitride layers, each layer of which laminated alternately. The optical thickness of each of the layers constituting the second mirror 36 is, for example, an integral multiple of ¼ of the design center wavelength. Note that silicon oxide layers may be used instead of the silicon nitride layers.

In a part of the second laminated body 34 corresponding to the gap S, a plurality of through holes 24b extending from a surface 34a of the second laminated body 34 to the gap S is included. The plurality of through holes 24b is formed to an extent that they do not substantially affect the function of the second mirror 36. The plurality of through holes 24b is used when the gap S is formed by removing a part of the intermediate layer 33 by etching.

In the first mirror 35, a first electrode 22 is formed in such a manner as to surround the light transmission region 10a. In the first mirror 35, a second electrode 23 is formed in such a manner as to surround the light transmission region 10a. Each of the first electrode 22 and the second electrode 23 is formed by doping a part of a polysilicon layer with an impurity to lower the resistance of the part of the polysilicon layer. The size of the second electrode 23 is substantially the same as the size of the light transmission region 10a.

In the second mirror 36, a third electrode 24 is formed. The third electrode 24 faces the first electrode 22 and the second electrode 23 via the gap S in a direction parallel to the center line (one-dot chain line illustrated in FIG. 4) of the light transmission region 10a. The third electrode 24 is formed by doping a part of a polysilicon layer with an impurity to lower the resistance of the part of the polysilicon layer.

In the Fabry-Perot interference filter 10, the second electrode 23 is positioned on the same plane as that of the first electrode 22 in a direction perpendicular to the center line of the light transmission region 10a. The distance between the second electrode 23 and the third electrode 24 is the same as the distance between the first electrode 22 and the third electrode 24. When viewed from a direction parallel to the center line of the light transmission region 10a, the second electrode 23 is surrounded by the first electrode 22.

The Fabry-Perot interference filter 10 includes a pair of terminals 25 with the light transmission region 10a interposed therebetween. Each of the terminals 25 is disposed in a through hole extending from the surface 34a of the second laminated body 34 to the first laminated body 32. Each of the terminals 25 is electrically connected to the first electrode 22 via wiring 22a.

The Fabry-Perot interference filter 10 includes a pair of terminals 26 with the light transmission region 10a interposed therebetween. Each of the terminals 26 is disposed in a through hole extending from the surface 34a of the second laminated body 34 to a layer before the intermediate layer 33. Each of the terminals 26 is electrically connected with the second electrode 23 via wiring 23a and is also electrically connected with the third electrode 24 via wiring 24a. Note that a direction in which the pair of terminals 26 is arranged with the light transmission region 10a interposed therebetween is perpendicular to a direction in which the pair of terminals 25 is arranged with the light transmission region 10a interposed therebetween (see FIG. 3).

In the first laminated body 32, a plurality of trenches 27 and 28 opened to the front surface 32a is formed. Each of the trenches 27 annularly extends in such a manner as to surround a portion of wiring 23a extending from one of the terminals 26 in a direction parallel to the center line of the light transmission region 10a. Each of the trenches 27 electrically insulates the first electrode 22 from the wiring 23a. The trench 28 annularly extends along the inner edge of the first electrode 22. The trench 28 electrically insulates the first electrode 22 from the second electrode 23. Regions inside the trenches 27 and 28 may be made of an insulating material or void.

In the second laminated body 34, a plurality of trenches 29 opened to the surface 34a is formed. Each of the trenches 29 annularly extends in such a manner as to surround one of the terminals 25. Each of the trenches 29 electrically insulates one of the terminals 25 from the third electrode 24. Regions inside the trenches 29 may be made of an insulating material or void.

On a surface 21b of the substrate 21 on a light emitting side, an antireflection layer 41, a third laminated body 42, an intermediate layer 43, and a fourth laminated body 44 are laminated in the order mentioned. The antireflection layer 41 and the intermediate layer 43 have a similar configuration to those of the antireflection layer 31 and the intermediate layer 33, respectively. The third laminated body 42 and the fourth laminated body 44 have lamination configurations symmetrical to those of the first laminated body 32 and the second laminated body 34, respectively, with respect to the substrate 21. The antireflection layer 41, the third laminated body 42, the intermediate layer 43, and the fourth laminated body 44 have a function of suppressing warping of the substrate 21.

The antireflection layer 41, the third laminated body 42, the intermediate layer 43, and the fourth laminated body 44 include an opening 40a in such a manner as to include the light transmission region 10a. When viewed from a direction parallel to the center line of the light transmission region 10a, the size of the opening 40a is substantially the same as the size of the light transmission region 10a. The opening 40a is open on the light emitting side, and a bottom surface of the opening 40a reaches the antireflection layer 41. A light shielding layer 45 is formed on a surface of the fourth laminated body 44 on the light emitting side. The light shielding layer 45 is made of, for example, aluminum. A protective layer 46 is formed on a surface of the light shielding layer 45 and an inner surface of the opening 40a. The protective layer 46 is made of, for example, aluminum oxide. Note that, by setting the thickness of the protective layer 46 at 1 to 100 nm (preferably, about 30 nm), optical influence by the protective layer 46 can be made negligible.

In the Fabry-Perot interference filter 10 configured as described above, when a potential difference is generated between the first electrode 22 and the third electrode 24 by applying a voltage to the first electrode 22 and the third electrode 24 via the plurality of terminals 25 and 26, an electrostatic force corresponding to the potential difference is generated between the first electrode 22 and the third electrode 24. With the electrostatic force generated between the first electrode 22 and the third electrode 24, the second mirror 36 is attracted to the first mirror 35, and the distance between the first mirror 35 and the second mirror 36 is adjusted. At this point, the second electrode 23 having the same potential as that of the third electrode 24 functions as a compensation electrode, and the second mirror 36 is kept flat in the light transmission region 10a. As described above, in the Fabry-Perot interference filter 10, the distance between the first mirror 35 and the second mirror 36 is allowed to be variable.

The wavelength of light transmitted through the Fabry-Perot interference filter 10 depends on the distance between the first mirror 35 and the second mirror 36 in the light transmission region 10a. Therefore, the wavelength of the light transmitted through the Fabry-Perot interference filter 10 can be selected by adjusting the voltage (potential difference generated between the first electrode 22 and the third electrode 24) applied to the first electrode 22 and the third electrode 24.

Note that, in the Fabry-Perot interference filter 10, in general, light having a peak wavelength $\lambda p$ that satisfies $\lambda p = 2nd/a$ (n: refractive index, d: distance between the first mirror 35 and the second mirror 36, a: integer) is transmitted through the first mirror 35 and the second mirror 36. That is, even in a case where the distance d between the first mirror 35 and the second mirror 36 is constant, light having a wavelength corresponding to each of a plurality of orders (a) is transmitted through the first mirror 35 and the second mirror 36. Therefore, in the light detection device 1, the band pass filter 14 and the light detector 8 are configured such that light (for example, second-order light) having a wavelength corresponding to a single order is detected for a predetermined distance d and that light (for example, first-order light and high-order light of third-order light or higher) having a wavelength corresponding to an order other than the single order is not detected.

Transmission Characteristics of Light Detection Device

As a premise, a light detection unit including the band pass filter 14 and the light detector 8 is configured to detect light in a wavelength range of a wavelength $\lambda 1$ or more and a wavelength $\lambda 2$ ($>\lambda 1$) or less. The fact that the light detection unit including the light detector 8 is configured to detect light in the wavelength range of the wavelength $\lambda 1$ or more and the wavelength $\lambda 2$ or less means that the light detector 8 has sufficient light receiving sensitivity for the light in the wavelength range and that 50% or more of light incident on the light detection unit reaches the light detector 8. In the present embodiment, the band pass filter 14 has a function of transmitting 50% or more of the light in the wavelength range of the wavelength $\lambda 1$ or more and the wavelength $\lambda 2$ or less, and the light detector 8 has sufficient light receiving sensitivity for the light in the wavelength range of the wavelength $\lambda 1$ or more and the wavelength $\lambda 2$ or less. That is, assuming that the Fabry-Perot interference filter 10 is not included, the light in the wavelength range of the wavelength $\lambda 1$ or more and the wavelength $\lambda 2$ or less is detected by the light detector 8 by cooperation of the band pass filter 14 and the light detector 8. Note that fact that the light detector 8 has sufficient light receiving sensitivity for the light in the wavelength range of the wavelength $\lambda 1$ or more and the wavelength $\lambda 2$ or less means that the light detector 8 has a sensitivity higher than or equal to 5% of the maximum sensitivity for the light in the wavelength range of the wavelength $\lambda 1$ or more and the wavelength $\lambda 2$ or less.

Based on the above premise, the control unit 50 applies a voltage to the Fabry-Perot interference filter 10 so that the distance between the first mirror 35 and the second mirror 36 changes in the distance range of a distance d1 or more and a distance d2 ($>$d1) or less. Incidentally, a voltage determination method for determining a voltage to be applied to the Fabry-Perot interference filter 10 will be described. Note that either one of a first step and a second step described below may be performed first, or both may be performed simultaneously.

Figure 5:
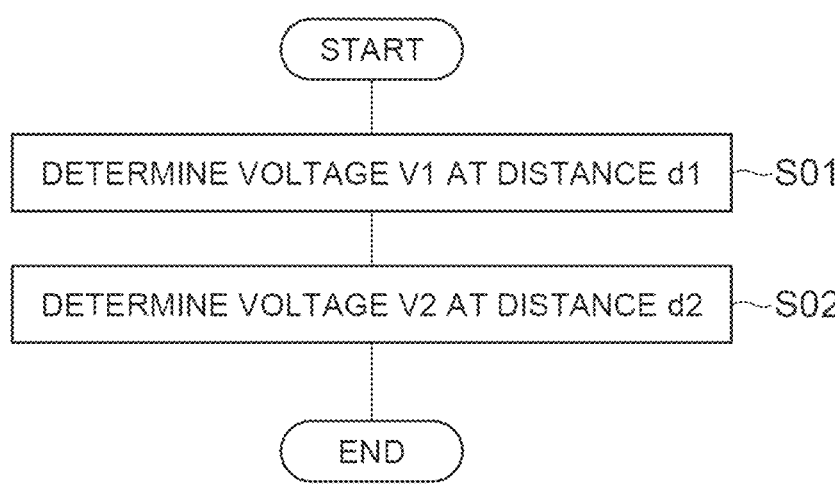
FIG. 5 is a flowchart of a voltage determination method according to an embodiment.
Figure 6:
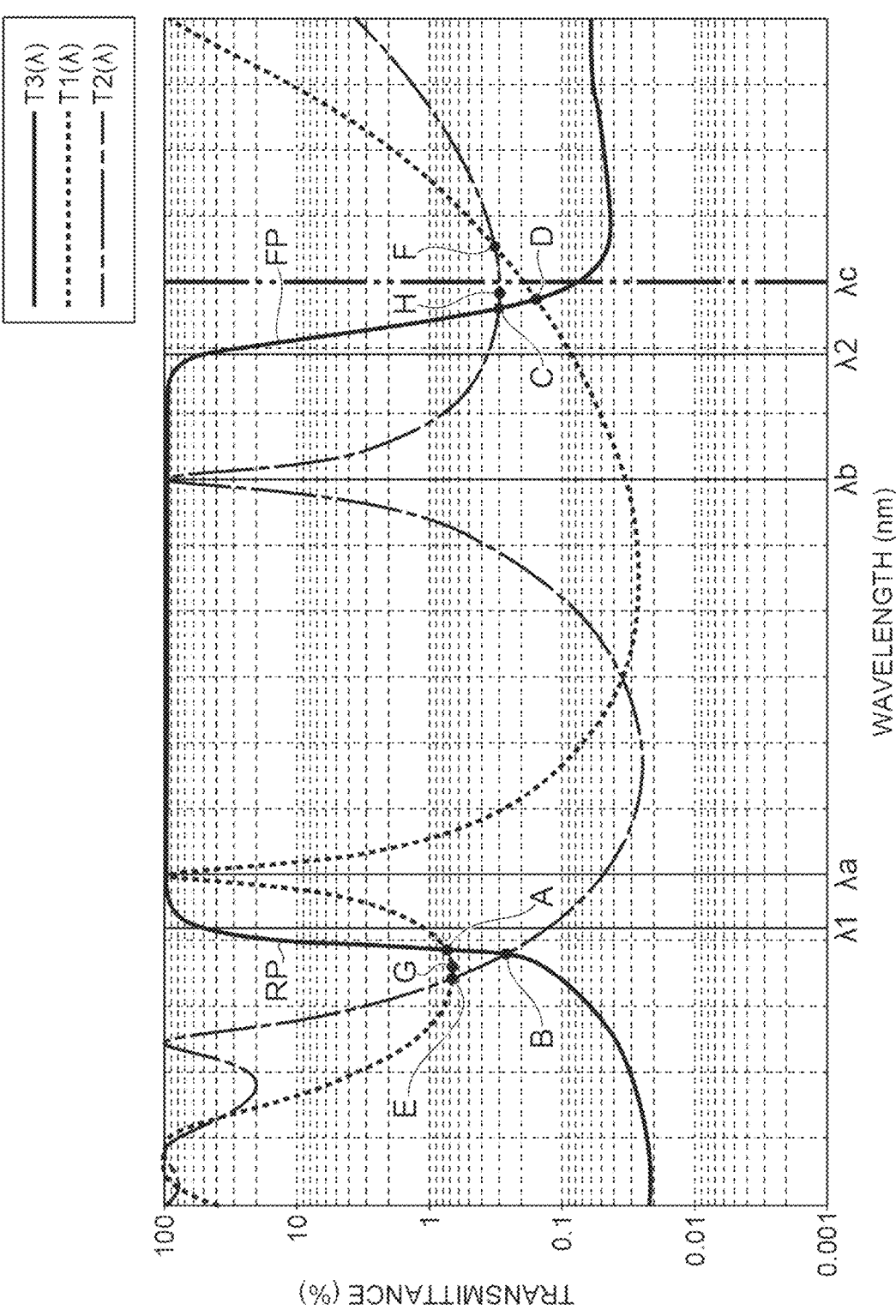
FIG. 6 is a graph illustrating transmission characteristics of the light detection device illustrated in FIG. 1.

First, as illustrated in FIG. 5, in first step S01, a voltage V1 at which the distance between the first mirror 35 and the second mirror 36 equals the distance d1 is determined. More specifically, as illustrated in FIG. 6, for a transmission spectrum T1 ($\lambda$) of light transmitted through the first mirror 35 and the second mirror 36 in a case where the distance between the first mirror 35 and the second mirror 36 is the distance d1, the voltage V1 is determined such that a peak transmittance T1 ($\lambda a$) at a wavelength $\lambda a$ corresponding to a single order appears within the wavelength range of the wavelength $\lambda 1$ or more and the wavelength $\lambda 2$ or less and that the peak transmittance T1 at the wavelength corresponding to an order other than the single order does not appear within the wavelength range. Furthermore, the voltage V1 is determined such that the transmittance T1 ($\lambda 2$) at the wavelength $\lambda 2$ is less than or equal to 1% for the transmission spectrum T1 ($\lambda$). Note that T1 ($\lambda$) means that "in a case where the distance between the first mirror 35 and the second mirror 36 is the distance d1, the transmittance of light transmitted through the first mirror 35 and the second mirror 36" is a function of the wavelength $\lambda$.

Subsequently, as illustrated in FIG. 5, in second step S02, a voltage V2 at which the distance between the first mirror 35 and the second mirror 36 equals the distance d2 is determined. More specifically, as illustrated in FIG. 6, for a transmission spectrum T2 ($\lambda$) of light transmitted through the first mirror 35 and the second mirror 36 in a case where the distance between the first mirror 35 and the second mirror 36 is the distance d2, the voltage V2 is determined such that a peak transmittance T2 ($\lambda b$) at a wavelength $\lambda b$ corresponding to a single order appears within the wavelength range of the wavelength $\lambda 1$ or more and the wavelength $\lambda 2$ or less and that the peak transmittance T2 at the wavelength corresponding to an order other than the single order does not appear within the wavelength range. Furthermore, the voltage V2 is determined such that the transmittance T2 ($\lambda 1$) at the wavelength $\lambda 1$ is less than or equal to 1% for the transmission spectrum T2 ($\lambda$). Note that T2 ($\lambda$) means that "in a case where the distance between the first mirror 35 and the second mirror 36 is the distance d2, the transmittance of light transmitted through the first mirror 35 and the second mirror 36" is a function of the wavelength $\lambda$.

Transmission characteristics of the light detection device 1 will be described in more detail with reference to FIG. 6. As described above, for the transmission spectrum T1 ($\lambda$), the peak transmittance T1 ($\lambda a$) at the wavelength $\lambda a$ corresponding to a single order appears within the wavelength range of the wavelength $\lambda 1$ or more and the wavelength $\lambda 2$ or less, and no peak transmittance T1 at a wavelength corresponding to an order other than the single order appears within the wavelength range. Furthermore, for the transmission spectrum T1 ($\lambda$), the transmittance T1 ($\lambda 2$) at the wavelength $\lambda 2$ is less than or equal to 1% (in the present embodiment, less than or equal to 0.1%). For the transmission spectrum T2 ($\lambda$), the peak transmittance T2 ($\lambda b$) at the wavelength $\lambda b$ corresponding to a single order appears within the wavelength range of the wavelength $\lambda 1$ or more and the wavelength $\lambda 2$ or less, and no peak transmittance T2 at a wavelength corresponding to an order other than the single order appears within the wavelength range. Furthermore, for the transmission spectrum T2 ($\lambda$), the transmittance T2 ($\lambda 1$) at the wavelength $\lambda 1$ is less than or equal to 1% (in the present embodiment, less than or equal to 0.1%). The difference between the wavelength $\lambda 2$ and the wavelength $\lambda b$ is larger than the difference between the wavelength $\lambda 1$ and the wavelength $\lambda a$.

The band pass filter 14 is configured to transmit light in the wavelength range of the wavelength $\lambda 1$ or more and the wavelength $\lambda 2$ or less. That is, the band pass filter 14 has a function of transmitting 50% or more of the light in the wavelength range of the wavelength $\lambda 1$ or more and the wavelength $\lambda 2$ or less. A transmission spectrum T3 ($\lambda$) of light transmitted through the band pass filter 14 includes a rising portion RP rising to the wavelength range of the wavelength $\lambda 1$ or more and the wavelength $\lambda 2$ or less and a falling portion FP falling from the wavelength range of the wavelength $\lambda 1$ or more and the wavelength $\lambda 2$ or less. Note that T3 ($\lambda$) means that "the transmittance of light transmitted through the band pass filter 14" is a function of the wavelength $\lambda$.

The transmittance at an intersection point D between transmission spectrum T1 ($\lambda$) and the falling portion FP is less than or equal to 1%. The transmittance at an intersection point B between the transmission spectrum T2 ($\lambda$) and the rising portion RP is less than or equal to 1%. The wavelength at an intersection point A between the transmission spectrum T1 ($\lambda$) and the rising portion RP is more than or equal to the wavelength at a bottom point G of the transmission spectrum T1 ($\lambda$). The bottom point G of the transmission spectrum T1 ($\lambda$) is a point that first appears on the short-wavelength side of the peak transmittance T1 ($\lambda a$) and is convex downward (namely, convex towards the side where the transmittance is lower). The wavelength at an intersection point C between the transmission spectrum T2 ($\lambda$) and the falling portion FP is less than or equal to the wavelength at a bottom point H of the transmission spectrum T2 ($\lambda$). The bottom point H of the transmission spectrum T2 ($\lambda$) is a point that first appears on the long-wavelength side of the peak transmittance T2 ($\lambda b$) and is convex downward (namely, convex towards the side where the transmittance is lower).

The wavelength at the bottom point H of the transmission spectrum T2 ($\lambda$) is less than or equal to a long-wavelength side cutoff wavelength $\lambda c$ of the light detector 8. The long-wavelength side cutoff wavelength $\lambda c$ of the light detector 8 is a value indicating a limit on the long-wavelength side of the spectral sensitivity characteristics and is, for example, a wavelength that is 10% of the maximum sensitivity.

The wavelength at the intersection point A between the transmission spectrum T1 ($\lambda$) and the rising portion RP and the wavelength at the intersection point B between the transmission spectrum T2 ($\lambda$) and the rising portion RP are more than or equal to a wavelength at an intersection point E between the transmission spectrum T1 ($\lambda$) and the transmission spectrum T2 ($\lambda$). The intersection point E between the transmission spectrum T1 ($\lambda$) and the transmission spectrum T2 ($\lambda$) is an intersection point that first appears on the short-wavelength side of the peak transmittance T1 ($\lambda a$). The wavelength at the intersection point C between the transmission spectrum T2 ($\lambda$) and the falling portion FP and the wavelength at the intersection point D between the transmission spectrum T1 ($\lambda$) and the falling portion FP are less than or equal to a wavelength at an intersection point F between the transmission spectrum T1 ($\lambda$) and the transmission spectrum T2 ($\lambda$). The intersection point F between the transmission spectrum T1 ($\lambda$) and the transmission spectrum T2 ($\lambda$) is a point that first appears on the long-wavelength side of the peak transmittance T2 ($\lambda b$).

The transmittance at the intersection point A between the transmission spectrum T1 ($\lambda$) and the rising portion RP is more than or equal to the transmittance at the intersection point B between the transmission spectrum T2 ($\lambda$) and the rising portion RP. The transmittance at the intersection point C between the transmission spectrum T2 ($\lambda$) and the falling portion FP is more than or equal to the transmittance at the intersection point D between the transmission spectrum T1 ($\lambda$) and the falling portion FP. In the present embodiment, the transmittance at each of the intersection points A, B, C, and D is less than or equal to 1%.

The transmittance at the intersection point A between the transmission spectrum T1 ($\lambda$) and the rising portion RP is more than or equal to the transmittance at the intersection point D between the transmission spectrum T1 ($\lambda$) and the falling portion FP. The transmittance at the intersection point C between the transmission spectrum T2 ($\lambda$) and the falling portion FP is more than or equal to the transmittance at the intersection point B between the transmission spectrum T2 ($\lambda$) and the rising portion RP.

Figure 7:
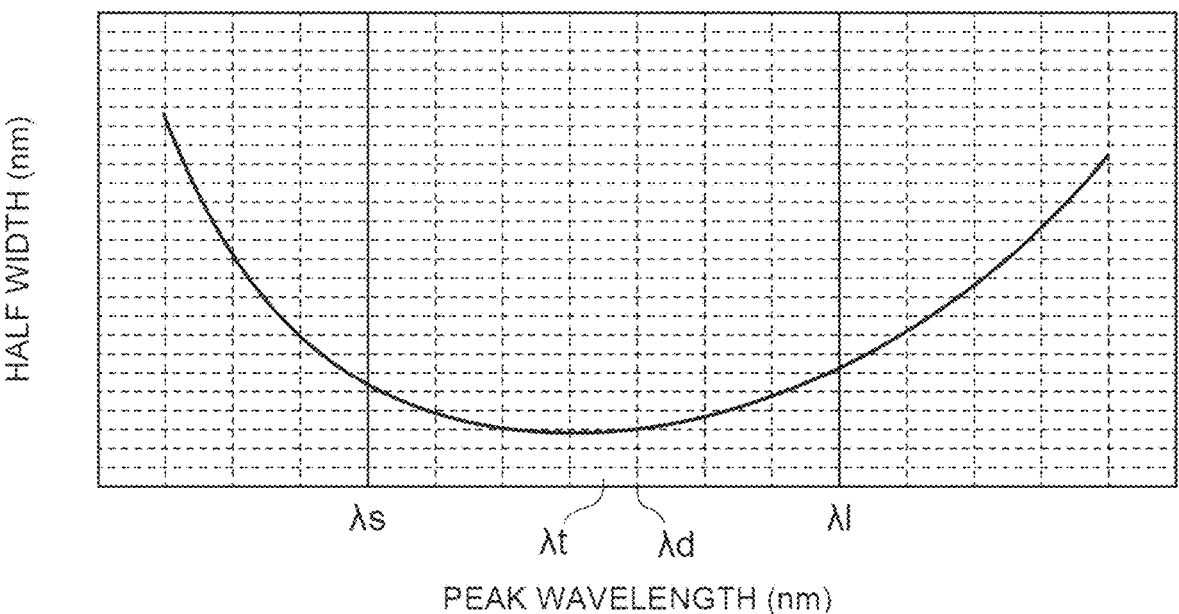
FIG. 7 is a graph illustrating a relationship between the peak wavelength and the half width in the Fabry-Perot interference filter illustrated in FIG. 2.

FIG. 7 is a graph illustrating a relationship between the peak wavelength and the half width in the Fabry-Perot interference filter 10. As illustrated in FIG. 7, in the Fabry-Perot interference filter 10, a transmission center wavelength $\lambda t$ is shifted to the short-wavelength side with respect to the design center wavelength $\lambda d$. The design center wavelength $\lambda d$ is a peak wavelength serving as a reference when the thickness of the intermediate layer 33, the optical thickness of each of the layers constituting the first mirror 35, and the optical thickness of each of the layers constituting the second mirror 36 are determined. The transmission center wavelength $\lambda t$ is a peak wavelength at the center between "a peak wavelength $\lambda s$ of light transmitted through the first mirror 35 and the second mirror 36 in a case where the distance between the first mirror 35 and the second mirror 36 is the distance d1" and "a peak wavelength $\lambda 1$ of light transmitted through the first mirror 35 and the second mirror 36 in a case where the distance between the first mirror 35 and the second mirror 36 is the distance d2". In a case where the half width for each peak wavelength tends to be smaller on the short-wavelength side than on the long-wavelength side, the fact that the transmission center wavelength $\lambda t$ is shifted to the short-wavelength side with respect to the design center wavelength $\lambda d$ is effective in improving the uniformity of the wavelength resolution. Note that the design center wavelength $\lambda d$ can be obtained by measuring the thickness of the intermediate layer 33, the optical thickness of each of the layers constituting the first mirror 35, and the optical thickness of each of the layers constituting the second mirror 36.

Actions and Effects

In the light detection system 100, for the transmission spectrum T1 ($\lambda$) of light transmitted through the first mirror 35 and the second mirror 36 in a case where the distance between the first mirror 35 and the second mirror 36 is the distance d1, the peak transmittance T1 (λa) at the wavelength λa corresponding to a single order appears within the wavelength range of the wavelength λ1 or more and the wavelength λ2 or less, and the transmittance T1 (λ2) at the wavelength λ2 that is the upper limit value of the wavelength range is less than or equal to 1%. As a result, when light having the wavelength λa corresponding to the single order is detected, not only light outside the wavelength range (such as light having a wavelength corresponding to an order preceding or following the single order) but also the light having the wavelength λ2 and a wavelength in the vicinity thereof are unlikely to be detected as noise light. In addition, for the transmission spectrum T2 (λ) of light transmitted through the first mirror 35 and the second mirror 36 in the case where the distance between the first mirror 35 and the second mirror 36 is the distance d2, the peak transmittance T2 (λb) at the wavelength λb corresponding to the single order appears within the wavelength range of the wavelength λ1 or more and the wavelength λ2 or less, and the transmittance T2 (λ1) at the wavelength λ1 is less than or equal to 1%, the wavelength λ1 being the lower limit value of the wavelength range. As a result, when light having the wavelength λb corresponding to the single order is detected, not only light outside the wavelength range (such as light having a wavelength corresponding to an order preceding or following the single order) but also the light having the wavelength λ1 and a wavelength in the vicinity thereof are unlikely to be detected as noise light. Therefore, according to the light detection system 100, light having a desired wavelength can be accurately detected.

In light detection system 100, the difference between the wavelength λ2 and the wavelength λb is more than the difference between the wavelength λ1 and the wavelength λa. As a result, when the light having the wavelength λb corresponding to the single order is detected, it is possible to more effectively suppress detection of the light having the wavelength λ1 and a wavelength in the vicinity thereof as noise light. This is because a peak interval of light of a plurality of orders transmitted through the first mirror 35 and the second mirror 36 in the case where the distance between the first mirror 35 and the second mirror 36 is the distance d2 tends to be wider than a peak interval of light of the plurality of orders transmitted through the first mirror 35 and the second mirror 36 in the case where the distance between the first mirror 35 and the second mirror 36 is the distance d1.

In light detection system 100, the band pass filter 14 is configured to transmit light in the wavelength range of the wavelength λ1 or more and the wavelength λ2 or less, and the transmission spectrum T3 (λ) of light transmitted through the band pass filter 14 includes the rising portion RP that rises to the wavelength range of the wavelength λ1 or more and the wavelength λ2 or less and the falling portion FP that falls from the wavelength range of the wavelength λ1 or more and the wavelength λ2 or less. As a result, a configuration for detecting light in a wavelength range of the wavelength λ1 or more and the wavelength λ2 or less can be easily and reliably implemented.

In the light detection system 100, the transmittance at the intersection point D of the transmission spectrum T1 (λ) and the falling portion FP is less than or equal to 1%, and the transmittance at the intersection point B of the transmission spectrum T2 (λ) and the rising portion RP is less than or equal to 1%. As a result, when the light having the wavelength λa corresponding to the single order is detected, it is possible to more effectively suppress detection of light outside the "wavelength range of the wavelength λ1 or more and the wavelength λ2 or less" (such as light having a wavelength corresponding to an order preceding or following the single order) as noise light. In addition, when the light having the wavelength λb corresponding to the single order is detected, it is possible to more effectively suppress detection of light outside the "wavelength range of the wavelength λ1 or more and the wavelength λ2 or less" (such as light having a wavelength corresponding to an order preceding or following the single order) as noise light.

In the light detection system 100, the wavelength at the intersection point A between the transmission spectrum T1 (λ) and the rising portion RP is more than or equal to the wavelength at the bottom point G of the transmission spectrum T1 (λ) appearing on the short-wavelength side of the peak transmittance T1 (λa). As a result, when the light having the wavelength λa corresponding to the single order is detected, it is possible to more effectively suppress detection of the light having the wavelength λ1 and a wavelength in the vicinity thereof as noise light.

In the light detection system 100, the wavelength at the intersection point C between the transmission spectrum T2 (λ) and the falling portion FP is less than or equal to the wavelength at the bottom point H of the transmission spectrum T2 (λ) appearing on the long-wavelength side of the peak transmittance T2 (λb). As a result, when light having the wavelength λb corresponding to the single order is detected, it is possible to more effectively suppress detection of the light having the wavelength λ2 and light having a wavelength in the vicinity thereof as noise light.

In the light detection system 100, the wavelength at the bottom point H of the transmission spectrum T2 (λ) is less than or equal to the long-wavelength side cutoff wavelength λc of the light detector 8. As a result, when light having the wavelength λb corresponding to the single order is detected, it is possible to more effectively suppress detection of the light having the wavelength λ2 and light having a wavelength in the vicinity thereof as noise light.

In the light detection system 100, the wavelength at the intersection point A of the transmission spectrum T1 (λ) and the rising portion RP and the wavelength at the intersection point B of the transmission spectrum T2 (λ) and the rising portion RP are more than or equal to the wavelength at the intersection point E of the transmission spectrum T1 (λ) and the transmission spectrum T2 (λ) appearing on the short-wavelength side of the peak transmittance T1 (λa). As a result, when the light having the wavelength λa corresponding to the single order and the light having the wavelength λb corresponding to the single order are detected, it is possible to more effectively suppress detection of the light having the wavelength λ1 and light having a wavelength in the vicinity thereof as noise light.

In the light detection system 100, the wavelength at the intersection point C between the transmission spectrum T2 (λ) and the falling portion FP and the wavelength at the intersection point D of the transmission spectrum T1 (λ) and the falling portion FP are less than or equal to the wavelength at the intersection point F between the transmission spectrum T1 (λ) and the transmission spectrum T2 (λ) appearing on the long-wavelength side of the peak transmittance T2 (λb). As a result, when light having a wavelength λa corresponding to a single order and light having a wavelength λb corresponding to a single order are detected, it is possible to more effectively suppress detection of light having the wavelength λ2 and light having a wavelength in the vicinity thereof as noise light.

In light detection system 100, the transmittance at the intersection point A of transmission spectrum T1 ($\lambda$) and the rising portion RP is more than or equal to the transmittance at the intersection point B between transmission spectrum T2 ($\lambda$) and the rising portion RP, and the transmittance at the intersection point C between transmission spectrum T2 ($\lambda$) and the falling portion FP is more than or equal to the transmittance at the intersection point D of the transmission spectrum T1 ($\lambda$) and the falling portion FP. As a result, when the light having the wavelength $\lambda$b corresponding to the single order is detected, it is possible to more effectively suppress detection of the light having the wavelength $\lambda$1 and a wavelength in the vicinity thereof as noise light. In addition, when the light having the wavelength $\lambda$a corresponding to the single order is detected, it is possible to more effectively suppress detection of the light having the wavelength $\lambda$2 and a wavelength in the vicinity thereof as noise light.

In light detection system 100, the transmittance at the intersection point A of the transmission spectrum T1 ($\lambda$) and the rising portion RP is more than or equal to the transmittance at the intersection point D of the transmission spectrum T1 ($\lambda$) and the falling portion FP. As a result, when the light having the wavelength $\lambda$a corresponding to the single order is detected, it is possible to more effectively suppress detection of the light having the wavelength $\lambda$2 and a wavelength in the vicinity thereof as noise light.

In light detection system 100, the transmittance at the intersection point C of the transmission spectrum T2 ($\lambda$) and the falling portion FP is more than or equal to the transmittance at the intersection point B of the transmission spectrum T2 ($\lambda$) and the rising portion RP. As a result, when the light having the wavelength $\lambda$b corresponding to the single order is detected, it is possible to more effectively suppress detection of the light having the wavelength $\lambda$1 and a wavelength in the vicinity thereof as noise light.

In the voltage determination method described above, in the case where the distance between the first mirror 35 and the second mirror 36 is the distance d1, the voltage V1 is determined such that, for the transmission spectrum T1 ($\lambda$) of light transmitted through the first mirror 35 and the second mirror 36, the peak transmittance T1 ($\lambda$a) at the wavelength $\lambda$a corresponding to the single order appears within the wavelength range of the wavelength $\lambda$1 or more and the wavelength $\lambda$2 or less and that the transmittance T1 ($\lambda$2) at the wavelength $\lambda$2 is less than or equal to 1%. As a result, when the light having the wavelength $\lambda$a corresponding to the single order is detected, it becomes difficult for the light having the wavelength $\lambda$2 and a wavelength in the vicinity thereof to be detected as noise light. In addition, in the case where the distance between the first mirror 35 and the second mirror 36 is the distance d2, the voltage V2 is determined such that, for the transmission spectrum T2 ($\lambda$) of light transmitted through the first mirror 35 and the second mirror 36, the peak transmittance T2 ($\lambda$b) at the wavelength $\lambda$b corresponding to the single order appears within the wavelength range of the wavelength $\lambda$1 or more and the wavelength $\lambda$2 or less and that the transmittance T2 ($\lambda$1) at the wavelength $\lambda$1 is less than or equal to 1%. As a result, when the light having the wavelength $\lambda$b corresponding to the single order is detected, it becomes difficult for the light having the wavelength $\lambda$1 and a wavelength in the vicinity thereof to be detected as noise light. According to the above-described voltage determination method, light having a desired wavelength can be accurately detected.

Modifications

Figure 8:
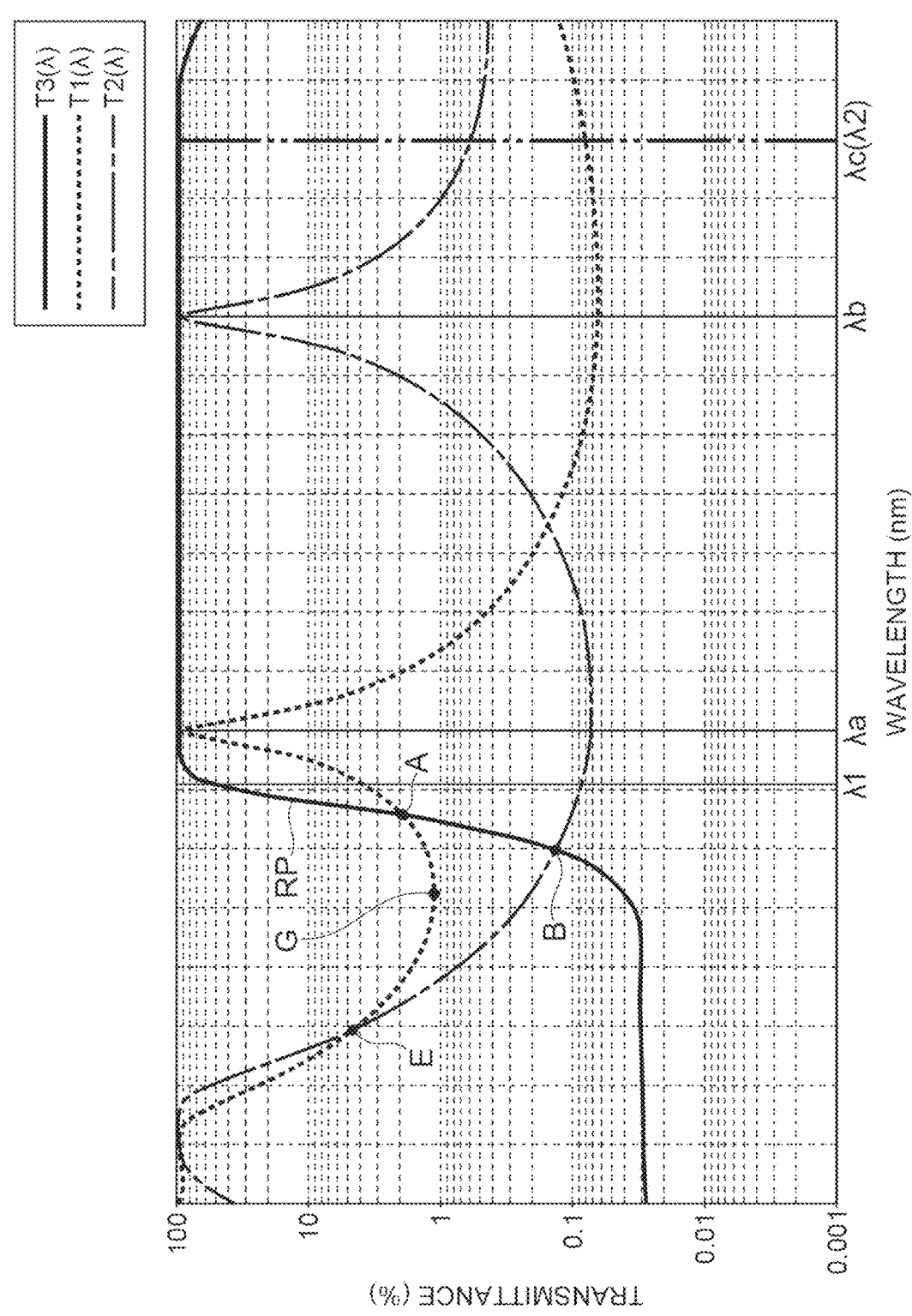
FIG. 8 is a graph illustrating transmission characteristics of a light detection device according to a modification.

The present disclosure is not limited to the above embodiments. For example, as illustrated in FIG. 8, the wavelength $\lambda$2 may correspond to the long-wavelength side cutoff wavelength $\lambda$c of the light detector 8. In the example illustrated in FIG. 8, the band pass filter 14 has a function of transmitting 50% or more of light in a wavelength range of the wavelength $\lambda$1 or more and a "wavelength larger than the wavelength $\lambda$2" or less, and the light detector 8 has sufficient light receiving sensitivity for light in a wavelength range of a "wavelength smaller than the wavelength $\lambda$1" or more and the wavelength $\lambda$2 or less. Also in the example illustrated in FIG. 8, assuming that the Fabry-Perot interference filter 10 is not included, light in the wavelength range off the wavelength $\lambda$1 or more and the wavelength $\lambda$2 or less is detected by the light detector 8 by cooperation of the band pass filter 14 and the light detector 8. As described above, also in the example illustrated in FIG. 8, it is possible to easily and reliably implement the configuration for detecting light in the wavelength range of the wavelength $\lambda$1 or more and the wavelength $\lambda$2 or less.

In the example illustrated in FIG. 8, the transmittance T2 ($\lambda$c) of the transmission spectrum T2 ($\lambda$) at the long-wavelength side cutoff wavelength $\lambda$c is more than or equal to a transmittance T1 ($\lambda$c) of the transmission spectrum T1 ($\lambda$) at the long-wavelength side cutoff wavelength $\lambda$c. As a result, when the light having the wavelength $\lambda$a corresponding to the single order is detected, it is possible to more effectively suppress detection of the light having the wavelength $\lambda$2 and a wavelength in the vicinity thereof as noise light.

In the example illustrated in FIG. 8, the transmittance T2 ($\lambda$1) at the wavelength $\lambda$1 is less than or equal to the transmittance T2 ($\lambda$c) of the transmission spectrum T2 ($\lambda$) at the long-wavelength side cutoff wavelength $\lambda$c. As a result, when the light having the wavelength $\lambda$b corresponding to the single order is detected, it is possible to more effectively suppress detection of the light having the wavelength $\lambda$1 and a wavelength in the vicinity thereof as noise light.

Figure 9:
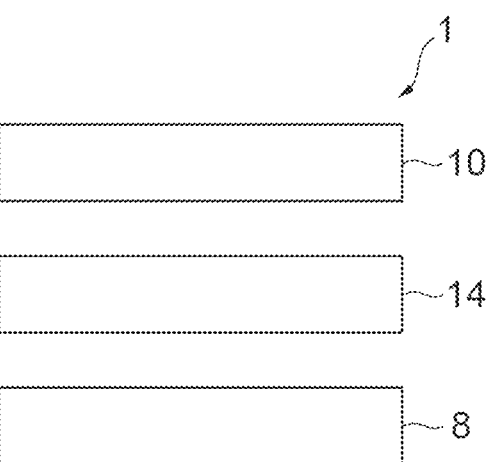
FIG. 9 is a configuration diagram of a light detection device according to the modification.

As illustrated in FIG. 9, the band pass filter 14 may be disposed between the Fabry-Perot interference filter 10 and the light detector 8. Alternatively, a configuration (for example, the substrate 21 or others) other than the portions constituting the first mirror 35 and the second mirror 36 in the Fabry-Perot interference filter 10 may function as a band pass filter together with the band pass filter 14. Alternatively, the configuration (for example, the substrate 21 or others) other than the portions constituting the first mirror 35 and the second mirror 36 in the Fabry-Perot interference filter 10 may function as a band pass filter instead of the band pass filter 14. Alternatively, the light detection device 1 may not include the band pass filter 14. As an example of this case, the light detector 8 may include a light receiving unit and a band pass filter disposed at a preceding stage of the light receiving unit. As described above, in the light detection system 100, it is sufficient that the light detection unit having the light detector 8 which the light transmitted through the first mirror 35 and the second mirror 36 enters be included, the light detection unit configured to detect light in the wavelength range of the wavelength $\lambda$1 or more and the wavelength $\lambda$2 or less.

In the Fabry-Perot interference filter 10, the transmission center wavelength $\lambda$t may not be shifted to the short-wavelength side with respect to the design center wavelength $\lambda$d. In the Fabry-Perot interference filter 10, the transmission center wavelength $\lambda$t may coincide with the design center wavelength $\lambda$d, or the transmission center wavelength $\lambda t$ may be shifted to the long-wavelength side with respect to the design center wavelength $\lambda d$.

REFERENCE SIGNS LIST 1 light detection device,
8 light detector (light detection unit),
10 Fabry-Perot interference filter,
14 band pass filter (light detection unit),
35 first mirror,
36 second mirror,
50 control unit,
100 light detection system

The invention claimed is:

1. A light detection system comprising:
a Fabry-Perot interference filter including a first mirror and a second mirror, a distance between the first mirror and the second mirror being variable;
a light detection unit including a light detector which light transmitted through the first mirror and the second mirror enters, the light detection unit configured to detect light in a wavelength range of a wavelength $\lambda 1$ or more and a wavelength $\lambda 2$ or less, wherein $\lambda 2 > \lambda 1$; and
a controller configured to apply a voltage to the Fabry-Perot interference filter such that the distance changes in a distance range of a distance d1 or more and a distance d2 or less, wherein d2 > d1,
wherein, for a transmission spectrum T1 $(\lambda)(\lambda$ denotes a wavelength) of light transmitted through the first mirror and the second mirror in a case where the distance is the distance d1, a peak transmittance T1 $(\lambda a)$ at a wavelength $\lambda a$ corresponding to a single order appears within the wavelength range, and a transmittance T1 $(\lambda 2)$ at the wavelength $\lambda 2$ is less than or equal to 1%,
for a transmission spectrum T2 $(\lambda)$ of light transmitted through the first mirror and the second mirror in a case where the distance is the distance d2, a peak transmittance T2 $(\lambda b)$ at a wavelength $\lambda b$ corresponding to a single order appears within the wavelength range, and a transmittance T2 $(\lambda 1)$ at the wavelength $\lambda 1$ is less than or equal to 1%,
the wavelength $\lambda 2$ is longer than a wavelength at a bottom point of the transmission spectrum T1 $(\lambda)$ that first appears on a long-wavelength side of the peak transmittance T1 $(\lambda a)$
the wavelength $\lambda 1$ is shorter than a wavelength at a bottom point of the transmission spectrum T2 $(\lambda)$ that first appears on a short-wavelength side of the peak transmittance T2 $(\lambda b)$,
the transmittance T1 $(\lambda 2)$ is smaller than a transmittance T1 $(\lambda 1)$ at the wavelength $\lambda 1$, and
the transmittance T2 $(\lambda 1)$ is smaller than a transmittance T2 $(\lambda 2)$ at the wavelength $\lambda 2$.

2. The light detection system according to claim 1, wherein a difference between the wavelength $\lambda 2$ and the wavelength $\lambda b$ is larger than a difference between the wavelength $\lambda 1$ and the wavelength $\lambda a$.

3. The light detection system according to claim 1,
wherein the light detection unit further includes a band pass filter disposed on a side opposite to the light detector with respect to the Fabry-Perot interference filter or between the Fabry-Perot interference filter and the light detector,
the band pass filter is configured to transmit light in the wavelength range, and a transmission spectrum T3 $(\lambda)$ of light transmitted through the band pass filter includes a rising portion rising to the wavelength range and a falling portion falling from the wavelength range.

4. The light detection system according to claim 3,
wherein a transmittance at an intersection point of the transmission spectrum T1 $(\lambda)$ and the falling portion is less than or equal to 1%, and
a transmittance at an intersection point of the transmission spectrum T2 $(\lambda)$ and the rising portion is less than or equal to 1%.

5. The light detection system according to claim 3,
wherein a wavelength at an intersection point of the transmission spectrum T1 $(\lambda)$ and the rising portion is more than or equal to a wavelength at a bottom point of the transmission spectrum T1 $(\lambda)$ appearing on a short-wavelength side of the peak transmittance T1 $(\lambda a)$.

6. The light detection system according to claim 3,
wherein a wavelength at an intersection point of the transmission spectrum T2 $(\lambda)$ and the falling portion is less than or equal to a wavelength at a bottom point of the transmission spectrum T2 $(\lambda)$ appearing on a long-wavelength side of the peak transmittance T2 $(\lambda b)$.

7. The light detection system according to claim 3,
wherein a wavelength at a bottom point of the transmission spectrum T2 $(\lambda)$ appearing on a long-wavelength side of the peak transmittance T2 $(\lambda b)$ is less than or equal to a long-wavelength side cutoff wavelength $\lambda c$ of the light detector.

8. The light detection system according to claim 3,
wherein a wavelength at an intersection point of the transmission spectrum T1 $(\lambda)$ and the rising portion and a wavelength at an intersection point of the transmission spectrum T2 $(\lambda)$ and the rising portion are more than or equal to a wavelength at an intersection point of the transmission spectrum T1 $(\lambda)$ and the transmission spectrum T2 $(\lambda)$ appearing on a short-wavelength side of the peak transmittance T1 $(\lambda a)$.

9. The light detection system according to claim 3,
wherein a wavelength at an intersection point of the transmission spectrum T2 $(\lambda)$ and the falling portion and a wavelength at an intersection point of the transmission spectrum T1 $(\lambda)$ and the falling portion are less than or equal to a wavelength at an intersection point of the transmission spectrum T1 $(\lambda)$ and the transmission spectrum T2 $(\lambda)$ appearing on a long-wavelength side of the peak transmittance T2 $(\lambda b)$.

10. The light detection system according to claim 3,
wherein a transmittance at an intersection point of the transmission spectrum T1 $(\lambda)$ and the rising portion is more than or equal to a transmittance at an intersection point of the transmission spectrum T2 $(\lambda)$ and the rising portion, and
a transmittance at an intersection point of the transmission spectrum T2 $(\lambda)$ and the falling portion is more than or equal to a transmittance at an intersection point of the transmission spectrum T1 $(\lambda)$ and the falling portion.

11. The light detection system according to claim 3,
wherein a transmittance at an intersection point of the transmission spectrum T1 $(\lambda)$ and the rising portion is more than or equal to a transmittance at an intersection point of the transmission spectrum T1 $(\lambda)$ and the falling portion.

12. The light detection system according to claim 3,
wherein a transmittance at an intersection point of the transmission spectrum T2 $(\lambda)$ and the falling portion is more than or equal to a transmittance at an intersection point of the transmission spectrum T2 $(\lambda)$ and the rising portion.

13. The light detection system according to claim 1, wherein the wavelength $\lambda2$ corresponds to a long-wavelength side cutoff wavelength $\lambda c$ of the light detector.

14. The light detection system according to claim 13, wherein a transmittance T2 $(\lambda c)$ of the transmission spectrum T2 $(\lambda)$ at the long-wavelength side cutoff wavelength $\lambda c$ is more than or equal to a transmittance T1 $(\lambda c)$ of the transmission spectrum T1 $(\lambda)$ at the long-wavelength side cutoff wavelength $\lambda c$.

15. The light detection system according to claim 13, wherein the transmittance T2 $(\lambda1)$ is less than or equal to a transmittance T2 $(\lambda c)$ of the transmission spectrum T2 $(\lambda)$ at the long-wavelength side cutoff wavelength $\lambda c$.

16. A voltage determination method of determining a voltage in a light detection device, the light detection device comprising:

a Fabry-Perot interference filter including a first mirror and a second mirror, a distance between the first mirror and the second mirror being variable; and a light detection unit including a light detector which light transmitted through the first mirror and the second mirror enters, the light detection unit configured to detect light in a wavelength range of a wavelength $\lambda1$ or more and a wavelength $\lambda2$ or less, wherein $\lambda2>\lambda1$ in a case where the voltage is applied to the Fabry-Perot interference filter such that the distance changes in a distance range of a distance d1 or more and a distance d2 or less, wherein d2>d1, the voltage determination method comprising:

a first step of determining a voltage V1 at which the distance equals the distance d1; and a second step of determining a voltage V2 at which the distance equals the distance d2, wherein, in the first step, for a transmission spectrum T1 $(\lambda)$ ($\lambda$ denotes a wavelength) of light transmitted through the first mirror and the second mirror in a case where the distance is the distance d1, the voltage V1 is determined such that a peak transmittance T1 $(\lambda a)$ at a wavelength $\lambda a$ corresponding to a single order appears within the wavelength range, a transmittance T1 $(\lambda2)$ at the wavelength $\lambda2$ is less than or equal to 1%, the wavelength $\lambda2$ is longer than a wavelength at a bottom point of the transmission spectrum T1 $(\lambda)$ that first appears on a long-wavelength side of the peak transmittance T1 $(\lambda a)$, and the transmittance T1 $(\lambda2)$ is smaller than a transmittance T1 $(\lambda1)$ at the wavelength $\lambda1$, and in the second step, for a transmission spectrum T2 $(\lambda)$ of light transmitted through the first mirror and the second mirror in a case where the distance is the distance d2, the voltage V2 is determined such that a peak transmittance T2 $(\lambda b)$ at a wavelength $\lambda b$ corresponding to a single order appears within the wavelength range, a transmittance T2 $(\lambda1)$ at the wavelength $\lambda1$ is less than or equal to 1%, the wavelength $\lambda1$ is shorter than a wavelength at a bottom point of the transmission spectrum T2 $(\lambda)$ that first appears on a short-wavelength side of the peak transmittance T2 $(\lambda b)$, and the transmittance T2 $(\lambda1)$ is smaller than a transmittance T2 $(\lambda2)$ at the wavelength $\lambda2$.

17. A light detection system comprising:

a Fabry-Perot interference filter including a first mirror and a second mirror, a distance between the first mirror and the second mirror being variable;

a light detection unit including a light detector which light transmitted through the first mirror and the second mirror enters, the light detection unit configured to detect light in a wavelength range of a wavelength $\lambda1$ or more and a wavelength $\lambda2$ or less, wherein $\lambda2>\lambda1$; and a controller configured to apply a voltage to the Fabry-Perot interference filter such that the distance changes in a distance range of a distance d1 or more and a distance d2 or less, wherein d2>d1, wherein, for a transmission spectrum T1 $(\lambda)$($\lambda$ denotes a wavelength) of light transmitted through the first mirror and the second mirror in a case where the distance is the distance d1, a peak transmittance T1 $(\lambda a)$ at a wavelength $\lambda a$ corresponding to a single order appears within the wavelength range, and a transmittance T1 $(\lambda2)$ at the wavelength $\lambda2$ is less than or equal to 1%, for a transmission spectrum T2 $(\lambda)$ of light transmitted through the first mirror and the second mirror in a case where the distance is the distance d2, a peak transmittance T2 $(\lambda b)$ at a wavelength $\lambda b$ corresponding to a single order appears within the wavelength range, and a transmittance T2 $(\lambda1)$ at the wavelength $\lambda1$ is less than or equal to 1%, the light detection unit further includes a band pass filter disposed on a side opposite to the light detector with respect to the Fabry-Perot interference filter or between the Fabry-Perot interference filter and the light detector, the band pass filter is configured to transmit light in the wavelength range, and a transmission spectrum T3 $(\lambda)$ of light transmitted through the band pass filter includes at least one of a rising portion rising to the wavelength range and a falling portion falling from the wavelength range.

* * * * *